Aug. 6, 1929.　　　F. K. KREUTZMANN　　　1,723,045
VEHICLE SIGNAL
Filed Oct. 29, 1928
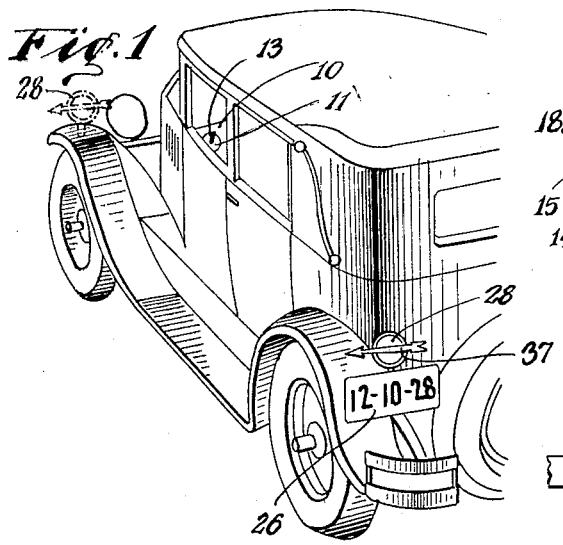
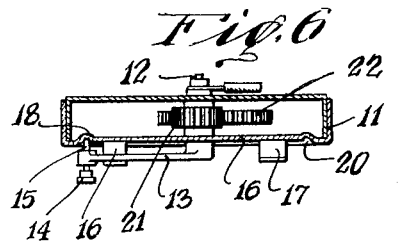
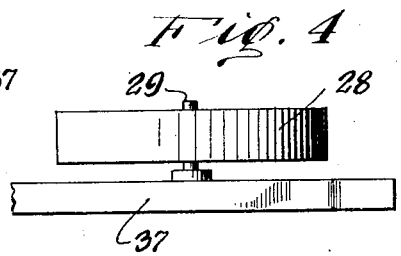
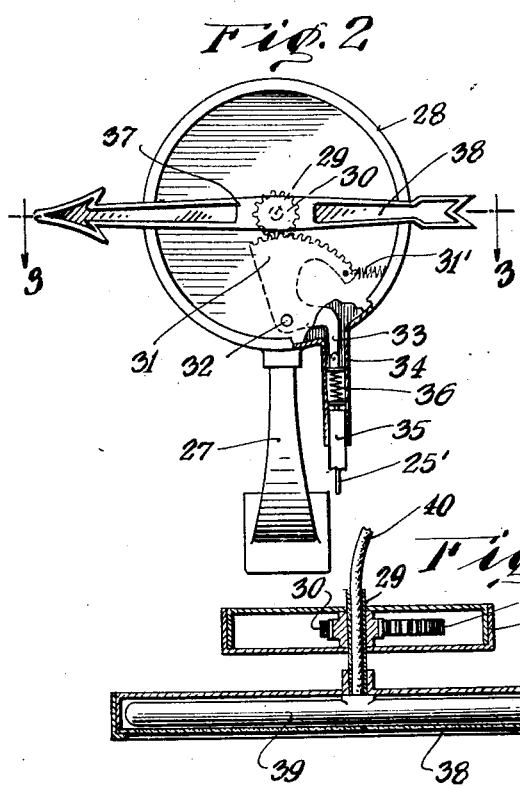
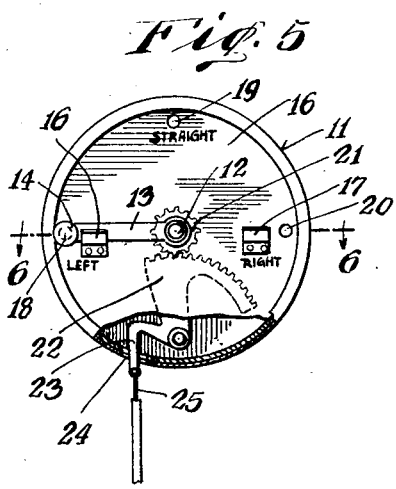
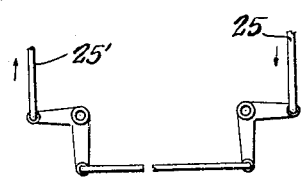
INVENTOR.
Frank K. Kreutzmann
BY
ATTORNEY Patented Aug. 6, 1929.

1,723,045

UNITED STATES PATENT OFFICE.

FRANK KL. KREUTZMANN, OF CINCINNATI, OHIO.

VEHICLE SIGNAL.

Application filed October 29, 1928. Serial No. 315,685.

This invention relates to vehicle signals, as controlled by an operator to signify the intended turning of the vehicle.

One object of the invention is to provide a mechanically operated, hand actuated signal capable of being disposed on the rear of a car or like vehicle, or other preferred location, and readily controlled by an operator from a point close to the steering wheel.

Another purpose is to produce means for causing the signal to show a light whenever desirable, the light being incorporated within the signal indicator.

These and other features, such as simplicity, low cost and high efficiency, are attained by the novel construction, arrangement and combination of parts hereinafter described and shown in the annexed drawing forming part of this disclosure, and in which:—

Figure 1 is a perspective view of a conventional type of automobile illustrating the application of an embodiment of the invention.

Figure 2 is a front elevational view of the signal device and support, parts being broken away to show the construction.

Figure 3 is a transverse sectional view taken on line 3—3 of Figure 1.

Figure 4 is a partial top plan view of the same.

Figure 5 is a front elevational view of the control mechanism at a place remote from the signal.

Figure 6 is a transverse sectional view taken on line 6—6 of Figure 5.

In the car shown in Figure 1, a dash board is designated by the numeral 10, the same being used to support the several instruments ordinarily carried by vehicles of the type indicated, and mounted on the dash board, convenient to the operator is a cylindrical casing 11.

Journalled axially in the casing is a spindle 12 having fixed on its outer extending front end, the hub of an arm 13 carrying at its free end a knob 14 engaged with a spring pressed detent 15.

Fixed in the front of the casing is a disc 16, over which the arm 14 is movable and secured on the face of the disc are two brackets 16—17 arranged to limit the movement of the arm when turned in either direction horizontally.

Formed in the face of the disc are three depressions 18—19—20, respectively at the left, top and right, at ninety degrees apart, these depressions being adapted to receive the inner end of the detent 15 and retain the arm in any of its adjusted positions, the depressions having adjacent to them the legends Left, Straight and Right, respectively inscribed on the disc face.

Secured to the spindle 12, within the casing, is a spur pinion 21 meshing with the corresponding teeth of a segment 22 pivoted at 23 in the lower part of the casing.

An offset arm 23 of the segment extends through an opening 24 in the periphery of the casing to engage a link 25 in such manner that when the arm is moved from one position to another, motion is communicated through the gearing to move the link rectilinearly.

At the back of the car, preferably near the left side, is shown a conventional license plate 26, behind which is secured a stand 27 supporting another cylindrical casing 28 and journalled axially therein is a hollow spindle 29.

Fixed on the spindle 29 is another pinion 30 meshed with a toothed segment 31 pivoted at 32 near the bottom of the casing and having an offset arm 33 extending downwardly in a tubular guide 34 formed on the casing. A tension spring 31 is arranged to take up any lost motion in the operative connections.

The link 25 is connected by suitable bellcrank levers and rods, not shown, to a similar link 25 having at its end a piston 35, slidable in the guide 34, which is connected through a spring member 36 to the arm 33.

Fixed on the outer end of the spindle 29 is a signal element 37 shaped to represent an arrow and consisting of an elongated hollow casing having a transparent front wall 38.

Disposed in the hollow arrow 38 is an elongated electric lamp bulb 39 to which a current is supplied from any convenient source by a cable 40 passing through the tubular spindle 29.

It will now be seen that, upon turning the arm 13 into any of its several positions, the signal arrow will be correspondingly moved and thus a clear indication of the car operator's intention may be manifested.

Should it be preferred, the signal elements may be placed at the front of the car, or on both the front and the rear as indicated on Figure 1.

Obviously, minor modifications may be resorted to without conflicting with the scope of the appended claims.

Having thus described my invention, what

I claim as new and desire to secure by Letters Patent is:—

1. In a vehicle signal including a casing and a pointer moving over the same, a gear and toothed segment in mesh therewith, and a means for operating said arm to indicate intended turns of the vehicle, said means comprising an operating arm adapted to be controlled from a point distant from the casing, and spring controlled means for connecting said arm with said toothed segment.

2. In a vehicle signal including a casing and a pointer, a means for imparting to said pointer a step by step movement into its various signaling positions from a distant point, said means comprising a hollow spindle for said pointer, a toothed segment pivoted at the lower end of said casing, an offset arm extending downwardly from said segment, an operating arm, a piston at the end of said arm, a tubular guide formed with the casing and a spring member connecting said piston with said offset arm.

In witness thereof I have affixed my signature.

FRANK KL. KREUTZMANN.